Feb. 5, 1929.
E. L. ALLINGTON
1,701,290
BRAKING MECHANISM FOR RAILROAD TRUCKS
Filed June 20, 1925     3 Sheets-Sheet 1
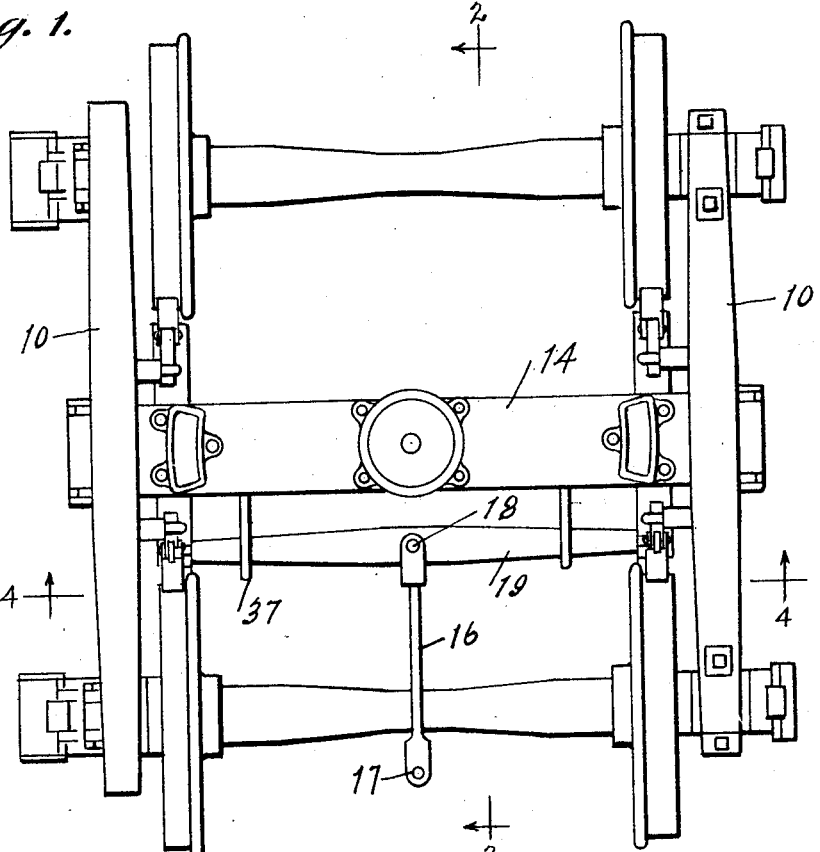
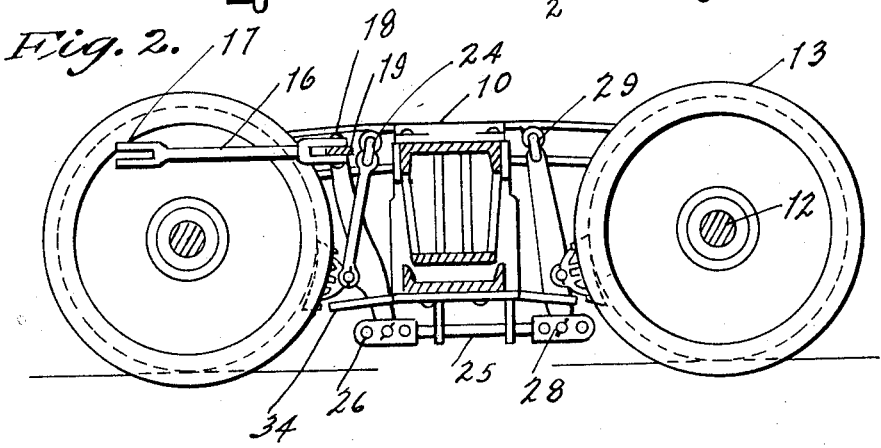
Inventor.
Edward L. Allington
By Tefft and Tefft
Attorneys.

Feb. 5, 1929.  1,701,290
E. L. ALLINGTON
BRAKING MECHANISM FOR RAILROAD TRUCKS
Filed June 20, 1925   3 Sheets-Sheet 2

Inventor
Edward L. Allington
By
Attorneys.

Feb. 5, 1929.
E. L. ALLINGTON
1,701,290
BRAKING MECHANISM FOR RAILROAD TRUCKS
Filed June 20, 1925 3 Sheets-Sheet 3
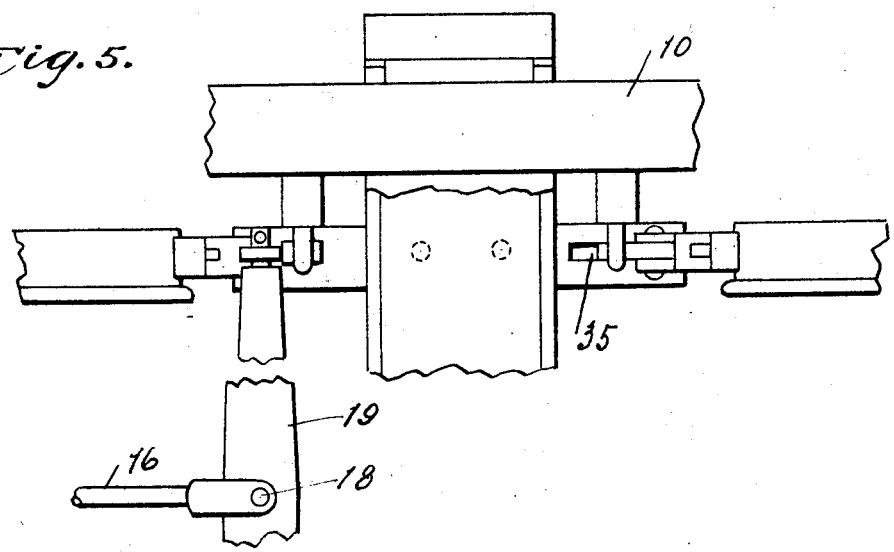
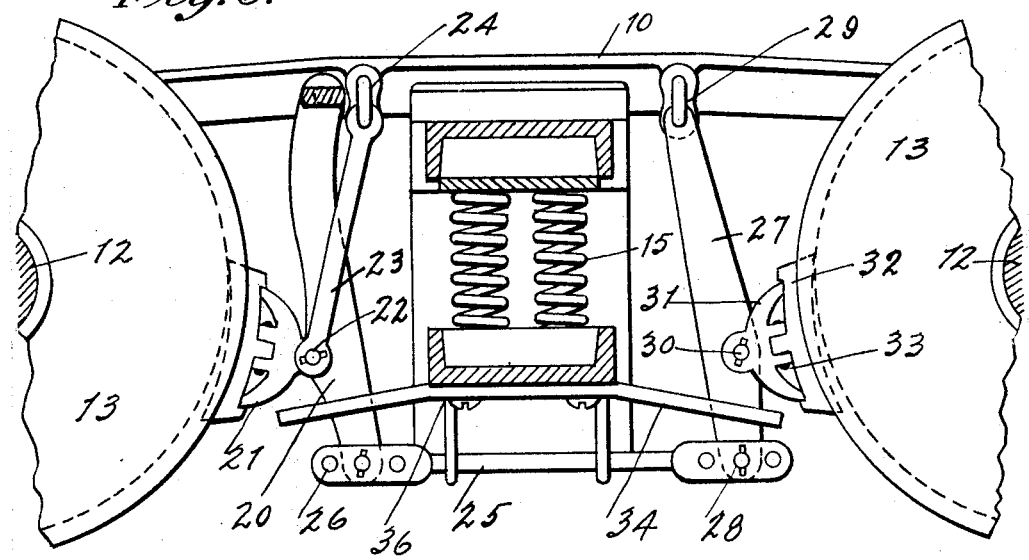

Patented Feb. 5, 1929.

1,701,290

UNITED STATES PATENT OFFICE.

EDWARD L. ALLINGTON, OF CHILLICOTHE, ILLINOIS.

BRAKING MECHANISM FOR RAILROAD TRUCKS.

Application filed June 20, 1925. Serial No. 38,412.

My invention relates to brake mechanism for railroad trucks and is adapted for use in connection with the well known double truck as well as to any other type of truck with slight mechanical changes.

The object of my invention is in the provision of simplified brake mechanism for use on the usual railroad truck.

A further object of my invention is in the provision of brake mechanism fashioned to not only increase the braking power but also to have the safety element of preventing the falling of any part onto the rails or therebetween, due to breakage caused by wear or the sudden and tremendous force placed thereupon, due to the application of the air brake.

Other objects of my invention will appear in the following specification taken in connection with the annexed drawings, in which Fig. 1, is a plan view from above of a truck having my brake mechanism applied thereto.

Fig. 2, is a sectional view taken on the line 2—2 of Fig. 1.

Fig. 5, is an enlarged detail of a portion of the brake mechanism, the same being in plan, and Fig. 6, is an enlarged detail in side elevation of the brake mechanism, with various portions thereof cut away.

Figure 3:
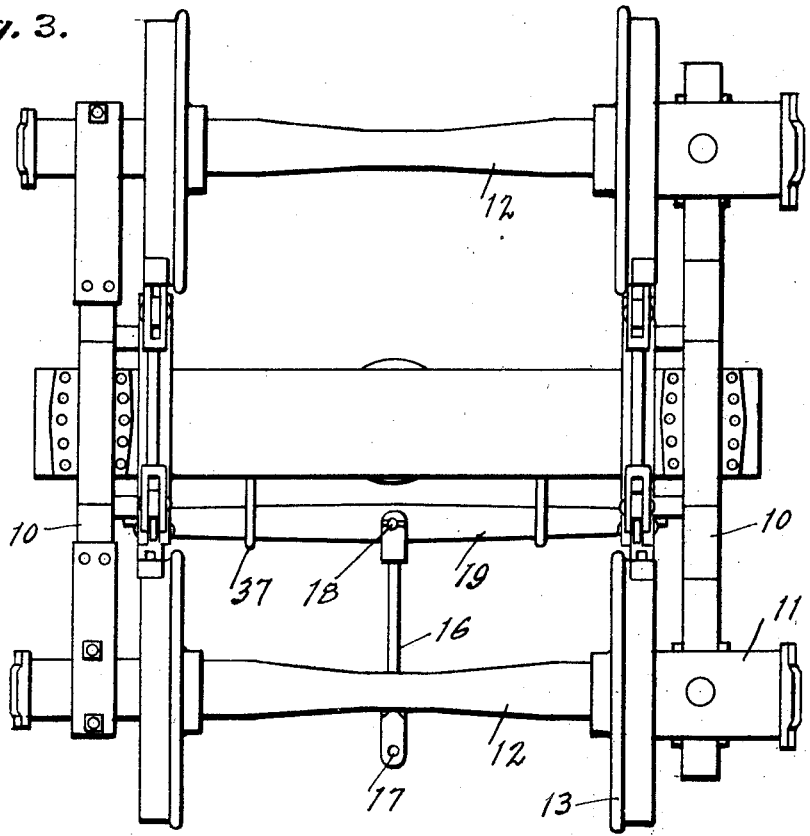
Fig. 3, is a plan view from below of Fig. 1.
Figure 4:
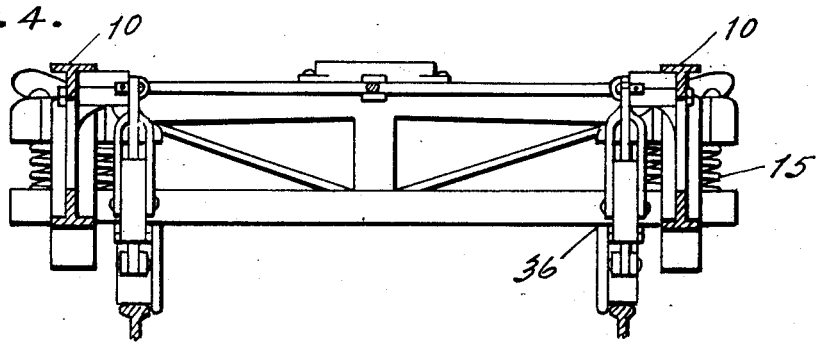
Fig. 4, is a sectional view taken on the line 4—4 of Fig. 1.

The present brake mechanism is adapted to be applied to any type of railroad truck and in the present instance has been applied to a well known structure, wherein the frame portions 10, house the bearings 11, carrying the axles 12 upon which are mounted the usual wheels 13.

Likewise there is shown at 14, the supporting structure for the car or rather for the body structure, whatever it may be. The spring tension shock absorbing means for the car body is shown at 15.

Obviously, the brake structure disclosed herein, is adapted to be controlled or rather operated by the well known air brake, the same, however, not being shown in the present instance, and it being well known that the application of air applies the brake and the shutting off thereof releases the brake mechanism.

My particular brake mechanism includes the following elements:

An extension top rod 16, is suitably and adjustably attached as at 17 to the air brake mechanism not shown. This extension top rod is pivotally attached at its opposite end as at 18 to a cross lever 19. The cross lever 19, has a pivotal attachment to two downwardly extending brake levers 20, said brake levers, at a point intermediate their ends, having a pivotal and fulcrumed engagement with the two forward brake heads 21, as well as the brake levers 20. The two above mentioned brake heads 21, have a pivotal engagement 22, with two brake hangers 23, that likewise have a loose connection 24 upon the inner sides of the frame members 10, of the railroad truck. The two brake levers 20 have at their lowermost ends, pivotal connection with two bottom rods 25. The pivotal connection above mentioned, is adjustable as shown at 26. The opposite or rearward ends of the bottom rods 25, engage two rear brake hangers 27 and this connection is again pivotal and adjustable as shown at 28. The rear brake hangers 27 have a loose mounting 29 upon the inside of the frame members 10, exactly as do the forward brake hangers. Pivoted to the rear brake hangers as at 30, and at a point adjacent the rear wheels of the truck, are two brake heads, 31. There is a similar mounting of brake heads on the forward hangers. Attached in a well known manner to the four brake heads above mentioned are brake shoes 32, the same being securely fastened by means of the brake shoe keys 33. Engaging in a positive manner a cross member on the truck proper are two brake lever guides or safety members 34, the same being disposed parallel to the bottom rods 25, however, at a point a substantial distance thereabove. These brake lever guides have their ends bifurcated as at 35, to permit a sliding movement therein, of the two brake levers, and the two rear brake hangers. The opposed ends of these brake lever guides or safety members 34, reach a point so close to the wheels of the truck that any passage therethrough of a disengaged brake head or brake shoe is prevented. Similarly, a broken hanger member would be supported and the falling of any portion thereof including the brake heads upon the rails prevented. A pair of downwardly projecting U or catch members are attached as at 36, to each of the brake lever guides in a manner to prevent the falling upon the rails of either of the bottom rods 25, in case of disengagement with the two brake levers or two rear brake hangers.

Likewise a pair of U or supporting members 37 are attached to the railroad truck, or rather in this instance to the car body supporting member 14, these same U members encircling the cross lever 19, in such manner as to prevent the downward movement thereof, in case of disengagement with either of the two brake levers 20. The operation of my brake mechanism is as follows:

The extension top rod is moved to a braking or releasing position by the air brake mechanism not shown. The movement of the extension top rod is transmitted to the four brake heads and shoes through the two brake levers, bottom rods and two rear brake hangers, which really act as levers. Obviously, the forward brake hangers must be included in the above transmission of power, because they support the forward brake heads as well as the brake levers.

The pivotal mounting of the above mentioned members synchronizes the distribution of power, and equalizes the braking action. Due to the particular fashioning of the above described braking mechanism, I am able to increase the leverage and therefore the braking action.

Also fewer parts are necessary and said parts may be of considerably less weight although permitting an increased braking power. The above use of fewer parts and of less weight naturally decreases the cost of construction, but the main reduction in cost occurs in the maintenance. The fact that in the present construction any part may readily be replaced without the tearing down of the entire braking mechanism, adds greatly to its utility.

Similarly, due to the safety construction, when any part is actually broken, its falling either upon or between the rails is prevented and hence the possibility of wrecks, due to such falling of broken elements upon the rails, is obviated.

What I claim is:

1. In a car truck having a frame, a brake lever, and a brake head attached to said lever; a member secured to said frame and extending beneath said brake head for supporting said brake head when it falls from its attached position, said member having a bifurcated end adapted to receive and guide said brake lever.

2. In a railroad car truck having a frame, a brake lever, and a brake element carried by said brake lever for frictionally engaging a wheel of said truck; a safety member secured to said frame and extending between said brake element and the track for preventing said brake element from falling onto the track, said safety member having one of its ends adapted to engage and guide said brake lever.

In testimony whereof I affix my signature.

EDWARD L. ALLINGTON.